Figure 1:
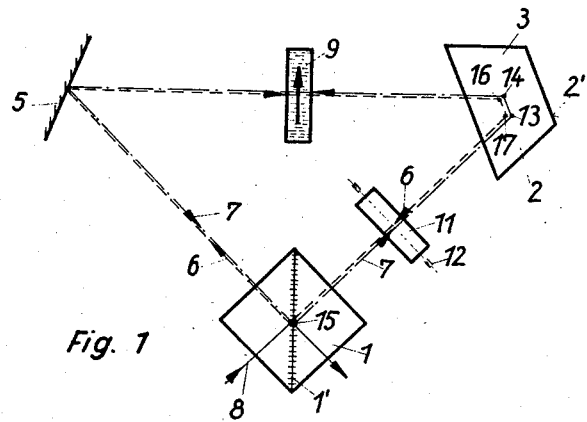

Dec. 30, 1958   K. RÄNTSCH   2,866,377
INTERFEROMETER
Filed May 19, 1955   2 Sheets-Sheet 1

United States Patent Office 2,866,377
Patented Dec. 30, 1958

2,866,377

INTERFEROMETER

Kurt Räntsch, Wetzlar, Germany, assignor to Carl Zeiss, Wurttemberg, Germany

Application May 19, 1955, Serial No. 509,516

Claims priority, application Germany May 20, 1954

10 Claims. (Cl. 88—14)

The invention concerns an interferometer, especially for ascertaining the course of refractive indices in stratified solutions. Already interferometers of the Jamin type have been suggested for the solution of this problem; however, these interferometers do not satisfy as yet in technical regard, because certain disadvantages are connected with them. Thus in these interferometers the light beams are divided by glass plates and again reunited, so that in each case a part of the light beam is reflected at one of the surfaces of the glass plates and the other part enters the glass plate and again leaves this only after doubly passing through the glass plate. The light paths coming from the cells containing the to-be-examined solution and a comparison solution are therefore not of equal length up to the point of union of the beams and it therefore is not possible without more ado, e. g. to image both cells equally sharply. Besides it is not possible with this interferometer to undertake with simple means an adjustment of the interference bands, rather one provides for these two plane-parallel glass plates in the light paths of the divided beams, which e. g. are tilted in opposite directions for adjusting the band interval and band width. These glass plates just like those serving for the division of the beam and its reuniting must be made with greatest optical precision, for example be of equal thickness, if one wishes to obtain interferences with white light. Therefore such an interferometer becomes expensive.

Therefore it is an object of the invention to provide an apparatus which in particular does not show the mentioned disadvantages. This apparatus is characterized in that it consists of a beam-splitting prism, a plane mirror, and an angle mirror and these parts are so arranged and constructed that the divided beams run around in the interferometer in opposite directions. Aside from the fact that this interferometer essentially consists of only three structural parts, it is not necessary to place great optical demands on these parts because the divided beams traverse the same optical elements and the path of rays is completely symmetrical. With that, however, assurance is given that the light paths of the divided beams from the sample and comparison liquid up to the point of union can without difficulty be made equally long, if only the cells are mounted in a suitable location in the path of rays, so that the cells can be imaged equally sharply by a common objective. Beyond that, however, it suffices, in suitable further development of the invention, for the purpose of adjusting the band width and the band interval of the interference bands, because of the oppositeness in direction of the beams, to mount a single plane-parallel plate tiltable in the path of rays. It is a further object of the invention to fashion the cells themselves as tiltable plane-parallel plates, so that the said plane-parallel plate may be omitted.

In a first example of the invention the angle mirror is advantageously arranged in such fashion that the line of intersection of its reflecting surfaces lies parallel to the plane formed by the divided beams. Through that the light rays falling upon it are laterally displaced and the to-be-examined solution and the comparison solution can be placed in cells lying side by side. The plane-parallel plate or also the cells fashioned as a plane-parallel plate provided for regulating the band width and the band interval, in this construction, for achieving interference bands lying perpendicular to the plane formed by the divided beams, are tilted about an axis lying perpendicular to the plane formed by the divided beams. If one wants to produce interference bands which lie parallel to the plane formed by the divided beams, then two parallel plates must be provided, which then in familiar fashion are tilted in opposite direction about axes parallel to the plane formed by the divided beams.

If the points of equal refractive indices during a mixing procedure of two liquids in these liquids have to be determined, then it is advantageous to place the to-be-examined solution and the comparison solution side by side in a common cell divided by a removable wall. The mixing then takes place after removal of this wall. The same result is obtained if one subdivides one of the cells lying side by side horizontally by a wall and places the to-be-examined solution in one of the spaces produced in this manner, in the other space and in the not subdivided cell the comparison solution.

If one wants to determine the points of equal refractive indices of a solution during centrifugation of this solution, then the cells are suitably mounted rotatable about an axis parallel to the light beams between the plane mirror and the angle mirror. Also thereby the two cells can lie directly side by side; however, then means must be provided through which is achieved that each cell after each revolution arrives into the same path of rays of the divided beams and no blurring of the cell images results. The beam displacement by the angle mirror can easily be selected so great through suitable fashioning and arrangement of this mirror, that the cells can also be mounted diametrically to the axis of rotation. Also hereby attention is to be paid that means are provided for separating the images superimposing themselves during the rotation.

Conditioned by the great lateral displacement of the divided beams in the latter case, in order to save material, in place of a single beam-splitting prism and a single plane mirror also two can be provided in each instance, which then are to be mounted one behind another so as if the middle piece had been cut out from them. It is a further object of the invention to replace the angle mirror by a roof prism. However, it has turned out that with use of the roof prism the divided beams by reflection at the roof surfaces of the roof prism are at least partially polarized in different vibration planes, so that in superposition unsharp interference bands arise. To avoid this in a further object of the invention the roof surfaces are advantageously metallized for attaining a metallic reflection. However, one can also suitably insert an analyser in the observation beam which then only transmits the components of the light vibrating in the same plane, so that again sharp interference bands arise.

If in another example of the invention one advantageously arranges the angle mirror so that the line of intersection of its reflecting surfaces lies perpendicular to the plane formed by the divided beams, then no lateral displacement of the divided beams any longer occurs, but now e. g. the image of the cell with the to-be-examined solution is imaged standing erect by the divided rays running in one direction and by the rays running in the opposite direction standing on its head. Both images superimpose, and the one of these images can take the place of the image of the comparison solution. For adjusting the band width and the band interval of interference bands lying parallel to the plane formed by the divided beams in this case only one plane-parallel plate is required tiltable about an axis parallel to the plane formed by the divided beams.

Figure 2:
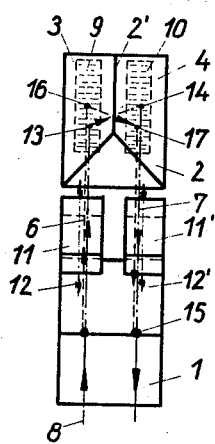
Figure 3:
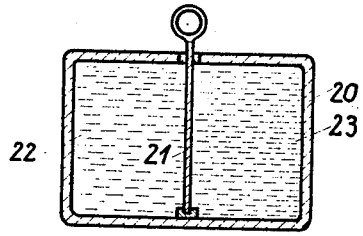
Figure 4:
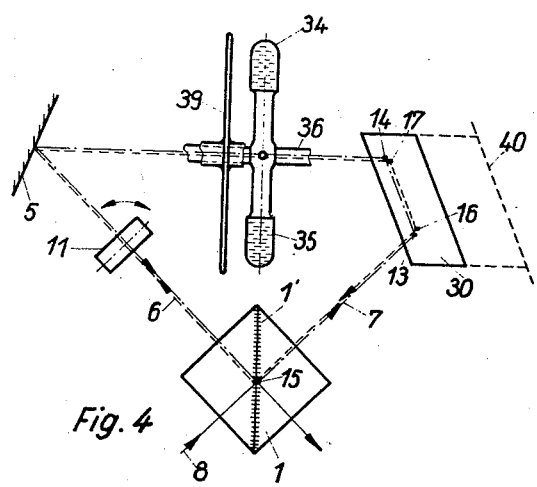
Figure 5:
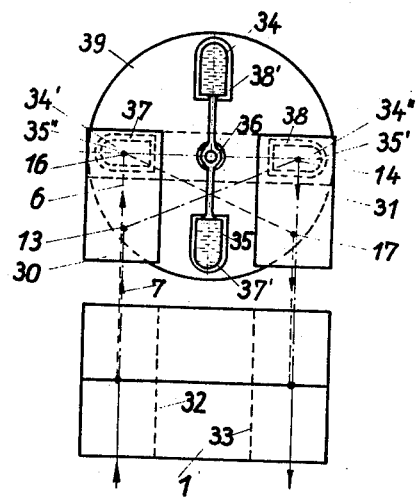

In the accompanying drawing, from which in connection with its description further details of the invention appear, examples of the object of the invention are represented, namely there is shown in Fig. 1 an interferometer according to the invention, Fig. 2 the side view of Fig. 1, Fig. 3 execution form of a cell for the interferometer according to Fig. 1, Fig. 4 an altered execution form of the interferometer according to Fig. 1, Fig. 5 the side view of Fig. 4.

In Figs. 1 and 2 a beam-splitting prism 1 with a semitransparent reflecting layer 1', a roof prism with metallized reflecting surfaces 3 and 4 which meet in the roof ridge 2', and a plane mirror 5 are so arranged that a light beam 8 divided in the beam-splitting prism 1 into the two portions 6 and 7 traverses the interferometer in opposite direction. Between plane mirror 5 and roof prism 2 two cells 9 and 10 are arranged of which in Fig. 1 only the cell 9 is to be seen and which in Fig. 2 are drawn with broken lines. The cell 9 contains a to-be-examined solution and the cell 10 a comparison solution. Between the beam-splitting prism 1 and the roof prism 2, two plane-parallel plates 11 and 11' are mounted tiltable about the axes 12 and 12'. The beam 7 falls in the roof prism 2 on the reflecting surface 3 at point 13. From there it is deflected to the point 14 of the reflecting surface 4. After leaving the roof prism 2 it traverses the cell 10 and after reflection at the plane mirror 5 again arrives in the beam-splitting prism 1, where at point 15 it passes through the semitransparent reflecting layer 1'. The light beam 6 leaving the beam splitting prism 1 is deflected by the plane mirror 5 into the cell 9 and falls, after traversing the cell, at point 16 on the reflecting surface 3. From there it is deflected to point 17 of the reflecting surface 4 and is superposed at point 15 of the semipermeable reflecting layer 1' on the beam 7. As is to be seen from Fig. 2 the divided beams are laterally displaced by the roof prism 2, namely beam 7 before it traverses the cell 10 and beam 6 after it has traversed the cell 9. Through tilting of the glass plates 11 and 11' about the axes 12 and 12' in opposite sense it is brought about that the beams are displaced out of the drawing plane of Fig. 1. Thereby they approach to or depart from one another corresponding to the direction of rotation of plates 11 and 11', so that they interfere with neighboring beams, whereby a possibility is provided for regulating the band interval. The bands arising thereby lie parallel to the drawing plane of Fig. 1. The cells 9 and 10 can be so arranged between the plane mirror 5 and the roof prism 2, that the light beams leaving them are of optically equal length up to their uniting in point 15 of the semitransparent reflecting layer 1', so that the cells and also the interference bands can be projected equally sharp on a screen by a suitable, not depicted, imaging optics.

An altered execution form of a cell for the instrument according to Fig. 1 is represented in Fig. 3. The cell, which has been designated by 20, shows a removable partition wall 21, so that a chamber results for each the to-be-examined liquid 22 and a comparison liquid 23. After removal of the wall 21 the liquids mix. The course of the refractive index during the process of mixing can now be observed if the cell 20 is placed in the location of the cells 9 and 10 of Fig. 1, namely so that the separation wall 21 coincides with the roof ridge 2' in Fig. 2.

Through an appropriate imaging optics then interference survers can be observed in the image of the cells projected on a screen, which insofar as the liquids have not yet been mixed, consist of parallel straight lines and which as a consequence of the refractive differences of the liquids are laterally displaced against one another. In the already mixed part the interference bands form curves, which connect the mentioned parallel bands.

In this case the cell 20 itself, in place of the plates 11 and 11', can be fashioned as a plane-parallel plate which is tiltable about an axis perpendicular to the drawing plane of Fig. 1, so that on the one hand interference bands lying perpendicular to the drawing plane of Fig. 1 are produced and on the other hand their interval and width can be regulated by tilting.

Figs. 4 and 5 show an altered execution form. The parts carried over from Fig. 1 are provided with the same reference numbers. The roof prism of Fig. 1 is replaced by an angle mirror with reflecting surfaces 30 and 31 which intersect in the straight line 40, and the two mirrors 30 and 31 are so arranged that again a displacement of the beams 6 and 7 is effected as in Fig. 1, this however, is essentially greater as appears from Fig. 5. Conditioned by the great lateral displacement of the beams a piece can be cut out of the beam splitting prism 1 along the broken lines 32 and 33 drawn in Fig. 5, for the purpose of saving material. The same possibility exists for the plane mirror 5, however, then special means are to be provided for the alignment of the individual parts. In Figs. 4 and 5 the cells of Fig. 1 are replaced by two cells 34 and 35, which are connected with a shaft 36. This can be rotated by a device not depicted. On the shaft 36 is seated rotatable a disk 39 with two diametrical holes 37 and 38 aligned with the cells 34 and 35. The disk 39 is connected through a not depicted transmission with the shaft 36 in such fashion that it rotates with half the angular velocity as the shaft 36. Through that is achieved, that in the positions 34' and 35' of the cells 34 and 35 the beam is interrupted by the disk 39, because the holes 37 and 38 lie in the positions 37' and 38', however, with turning the cells 34 and 35 into the position 34" and 35" the light beam 7 traverses the cell 34 and the hole 37, and the light beam 6 the cell 35 and the hole 38, whereby a blurring of the cell images during rotation is avoided. In place of this arrangement of the disk 39 also other suitable means can be provided for separating the cell images, for example a polarizing device. For regulating the band width and the band interval the plane-parallel plate 11 is tiltable in the direction of the arrow in Fig. 4. Thereby interference bands arise which are perpendicular to the drawing plane in Fig. 4.

I claim:

1. In an interferometer for ascertaining the refractive index course in stratified solutions, having a beam splitting prism for dividing a light beam into a reflected portion and a transmitted portion, a plane mirror, and two cells with a comparison solution and a to-be-examined solution as well as an angle mirror, said cells being arranged side by side, one portion of the split light being received by the plane mirror and directed through the one cell to the angle mirror and by the angle mirror back to the splitting prism and the other portion of the split light being received by the angle mirror and directed through the other cell to the plane mirror and by the plane mirror back to the splitting prism which recombines the return beam portions into an interference refractive index pattern, a tiltable plane parallel plate arranged in the path of both portions of the split light so as to be transmitted by said portions to adjust the interference fringes produced by the interferometer.

2. In an interferometer for ascertaining the refractive index course in stratified solutions, having a beam splitting prism for dividing a light beam into a reflected portion and a transmitted portion, a plane mirror, and two cells with a comparison solution and to-be-examined solution as well as an angle mirror arranged with its line of intersection of the reflecting surfaces parallel to the plane formed by the beam portions, both cells lying side by side, one portion of the split light being received by the plane mirror and directed through the one cell to the angle mirror and by the angle mirror back to the splitting prism and the other portion of the split light being received by the angle mirror and directed through the other cell to the plane mirror and by the plane mirror back to the splitting prism which recombines the returned beam portions into an interference refractive index pattern, a tiltable plane parallel plate arranged in the path of both portions of light so as to be transmitted by said portions to adjust the interference bands produced by said interferometer.

3. Interferometer as in claim 1, characterized in that the to-be-examined solution and a comparison solution are disposed in cells fashioned as a tiltable plane-parallel plate.

4. Interferometer as in claim 1, characterized in that the line of intersection of the reflecting surfaces of the angle mirror lies parallel to the plane formed by the beam portions.

5. Interferometer as in claim 1, characterized in that the to-be-examined solution and the comparison solution are disposed in a common cell separated by a removable wall.

6. Interferometer as in claim 1, characterized in that the cells are mounted rotatable about an axis parallel to the light beams between the plane mirror and the angle mirror.

7. Interferometer as in claim 1, characterized in that the cells are mounted rotatable about an axis parallel to the light beams between the plane mirror and the angle mirror and that the cells are mounted diametrical to the rotation axis.

8. Interferometer as in claim 1, characterized in that the angle mirror is a roof prism.

9. Interferometer as in claim 1, characterized in that the angle mirror is a roof prism and that the roof surfaces of said roof prism are metalized for attaining a metallic reflection.

10. Interferometer as in claim 1, characterized in that the angle mirror is a roof prism and polarisation means are inserted in the observation beam of the interferometer.

References Cited in the file of this patent

UNITED STATES PATENTS

| | | |
|---|---|---|
| 2,571,937 | Peck | Oct. 16, 1951 |
| 2,660,922 | Philpot | Dec. 1, 1953 |
| 2,699,092 | Rantsch | Jan. 11, 1955 |

FOREIGN PATENTS

| | | |
|---|---|---|
| 595,211 | Germany | Apr. 12, 1934 |
| 555,672 | Great Britain | Sept. 2, 1943 |
| 1,057,486 | France | Oct. 28, 1953 |